US011209642B2

(12) United States Patent
Fanget et al.

(10) Patent No.: US 11,209,642 B2
(45) Date of Patent: Dec. 28, 2021

(54) MOVABLE PHASED OPTICAL GRATING SCANNER

(71) Applicant: COMMISSARIAT A L'ENERGIE ATOMIQUE ET AUX ENERGIES ALTERNATIVES, Paris (FR)

(72) Inventors: Stephane Fanget, Grenoble (FR); Fabrice Casset, Grenoble (FR); Laurent Mollard, Grenoble (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 0 days.

(21) Appl. No.: 16/921,117

(22) Filed: Jul. 6, 2020

(65) Prior Publication Data

US 2021/0011280 A1      Jan. 14, 2021

(30) Foreign Application Priority Data

Jul. 8, 2019   (FR) ..................... 19 07589

(51) Int. Cl.
*G02B 26/10*   (2006.01)

(52) U.S. Cl.
CPC ................ *G02B 26/103* (2013.01)

(58) Field of Classification Search
None
See application file for complete search history.

(56) References Cited

U.S. PATENT DOCUMENTS

| 3,941,927 | A | * | 3/1976 | Russell | ............... | G02B 26/103 |
| | | | | | | 359/196.1 |
| 2004/0122328 | A1 | * | 6/2004 | Wang | ............... | A61B 1/00167 |
| | | | | | | 600/476 |
| 2017/0101306 | A1 | * | 4/2017 | Pinter | ............... | B81B 3/0043 |
| 2017/0299697 | A1 | * | 10/2017 | Swanson | ............ | G01N 21/4795 |
| 2019/0353893 | A1 | * | 11/2019 | Wu | ............... | G02B 26/06 |

FOREIGN PATENT DOCUMENTS

| JP | 10-090625 A | 4/1998 |
| WO | WO 2018/222727 A1 | 12/2018 |

OTHER PUBLICATIONS

French Preliminary Search Report dated Mar. 19, 2020 in French Application 19 07589 filed on Jul. 8, 2019 (with English Translation of Categories of Cited Documents), citing documents AO-AP & AY therein, 2 pages.
Chollet, "Devices Based on Co-Integrated MEMS Actuatorsand Optical Waveguide: A Review", Micromachines, 7, 18, 2016, 33 pages.
Tu et al., "State of the Art and Perspectives on Silicon Photonic Switches", Micromachines, 10, 51, 2019, 19 pages.
Phare et al., "Silicon Optical Phased Array with High-Efficiency Beam Formation over 180 Degree Field of View", Applied Physics Optics, 2018, 12 pages.

* cited by examiner

*Primary Examiner* — Chad H Smith
(74) *Attorney, Agent, or Firm* — Oblon, McClelland, Maier & Neustadt, L.L.P.

(57) ABSTRACT

A scanner includes at least a support including at least one first movable part, an actuator configured to move the first movable part of the support, and a phased optical grating disposed on the first movable part of the support. The grating includes at least one plurality of optical phase shifters and an optical source coupled to a plurality of optical phase shifters which is able to emit an optical beam coming from the optical source.

13 Claims, 5 Drawing Sheets

MOVABLE PHASED OPTICAL GRATING SCANNER

TECHNICAL FIELD

This document relates to a scanner or a micro-scanner, i.e. a device that makes it possible to emit an optical wave, or light wave, scanning a surface or a volume, as well as a method for producing such a scanner or micro-scanner. This document can be used for one of the following fields:

- 2D (two dimensional) or 3D (three dimensional) optical scanner;
- 3D imaging, for example for scanning a scene which is the reconstituted in 3D with an imager;
- Image projection, for example within a pico-projector (miniaturised projector) or to produce an intraretinal projection;
- Endoscopy;
- LIDAR, for example used in an autonomous vehicle or other.

PRIOR ART

A 2D optical micro-scanner is a device that makes it possible to scan a scene with an optical beam, or light beam, scanning the space according to two dimensions, i.e. scanning a surface.

Such a 2D optical micro-scanner is for example produced with one or more micro-mirrors.

A first 2D micro-scanner with micro-mirrors architecture consists of using two micro-mirrors. Each one of the two micro-mirrors makes it possible to direct an incident optical beam parallel to a direction of scanning, the two directions of scanning of the two micro-mirrors being perpendicular with respect to one another. A first of the two micro-mirrors receives the beam coming from an optical source and reflects it in the direction of a second of the two micro-mirrors. The first micro-mirror is set into motion so that the optical beam reflected by the first micro-mirror optically scans the reflective surface of the second micro-mirror and in such a way that the optical beam reflected by the second micro-mirror, also set into motion, can scan a scene according to the plane defined by the two directions of scanning. Such a micro-scanner is however not compact and is difficult to manufacture due to the required alignment of the two micro-mirrors with respect to one another for managing the reflection of the incident beam on the mirrors. Furthermore, the dimensions of the second micro-mirror must be substantial. Heating problems can also arise in such a micro-scanner.

A second architecture of a 2D micro-scanner with micro-mirror consists of using a single mirror that is movable about two axes perpendicular with respect to one another, which makes it possible to reflect an incident optical beam by having it produce a scan along two perpendicular directions. Such a micro-scanner however gives rise to mechanical crosstalk problems caused by the imperfections of the decoupling arms of the actuator used to set the micro-mirror in motion. Actuating along an axis generally generates a parasite movement along the other axis because the two axes are never perfectly uncoupled.

It is also possible to produce a 2D optical micro-scanner with an OPA (Optical Phased Array), also called phased optical emitter or phased optical grating. Such a micro-scanner includes several sources of optical beams often coming from the same initial source emitting a main optical beam divided into several sub-beams for example by means of waveguides. The sub-beams are then phase shifted with respect to one another in such a way as to produce, during the emission thereof, an optical wave of which the angle of emission, with respect to the surface from which the optical wave is emitted, can be adjusted by adjusting the value of the phase shifting between each sub-beam. This operating principle can be extrapolated to a 2D array of optical sources allowing for a scanning of an optical beam along two directions perpendicular to one another.

An OPA can be produced from optical sources operating in transmission, such as for example outputs of optical guides, or of optical sources operating in bending, with in this case a controlling of the phase of each source which is provided by the position of a micro-mirror that is part of an array of micro-mirrors.

For many applications, 2D optical micro-scanners require scanning the space with a first so-called "slow" axis and a second so-called "fast" axis, and this with scanning angles that can exceed 100° in the two directions. For example, the targeted frequency for a projection application is 60 Hz for the slow axis (which corresponds to the video refresh rate) and 40 kHz for the fast axis in order to obtain an HD 1080 resolution. For a LIDAR application, the frequencies linked to the slow and fast axes are defined by the number of points per frame which is according to the size of the object to be detected over a given distance (for example, the frequency linked to the slow axis is equal to 10 Hz and that linked to the fast axis is equal to 1 kHz).

The MEMS actuators used for the movement of the micro-mirrors make it possible to reach optical scan angles of about 100° but to this end, they must generally operate at the mechanical resonance frequency in order to maximise the amplitude of the movements of the micro-mirrors. However, the mechanical resonance frequencies of the MEMS actuators are rarely less than 1 kHz and often at least equal to at least 10 kHz due to the stiffness of the material (for example of the silicon) used and their small size. The movements along the slow axis are therefore difficult to produce.

DISCLOSURE OF THE INVENTION

Thus there is a need to propose a scanner or micro-scanner that does not have the disadvantages of the devices of the prior art disclosed hereinabove, and which is adapted to produce a scan along, one, two or three dimensions, with an emission angle of a substantial value for each dimension.

To this end, one embodiment proposes a scanner including at least:

- a support including at least one first movable part,
- an actuator configured to move the first movable part of the support, and
- a phased optical grating disposed on the first movable part of the support and including at least one plurality of optical phase shifters and an optical source coupled to the plurality of optical phase shifters which is able to emit an optical beam coming from the optical source.

This scanner cleverly combines a phased optical grating with a movable part moved by an actuator so that the optical beam emitted from the optical phase shifters can produce a scan along one, two or even three dimensions. Such a scanner therefore makes it possible to combine the scan obtained by setting into motion the first movable part of the support and the one obtained via the phase shifting produced by the phased optical grating.

Such a scanner is more compact and easier to manufacture than a scanner that requires aligning two micro-mirrors. The scanner proposed does not give rise to crosstalk problems, contrary to scanners that use a single micro-mirror that has to be moved along two axes. Furthermore, producing this scanner does not require managing the flatness of the mirrors or depositing reflective material on the mirrors.

This scanner also does not give rise to a problem in relation to the movements according to a slow axis due to the fact that these movements of the optical beam can be provided by the phased optical grating if the scan is to be produced according to a fast axis and a slow axis.

The scanner advantageously corresponds to a micro-scanner, i.e. a scanner comprising elements of micrometric or nanometric dimensions. This micro-scanner may correspond to a component of the MEMS or NEMS type.

The actuator may be of the MEMS or NEMS type.

The actuator may be configured to move the first movable part of the support in rotation about at least one first axis of rotation. This movement contributes to the scanning of the optical beam emitted from the optical phase shifters according to a first dimension, i.e. parallel to a first direction of scanning.

Here and in all the remainder of the document, the expression "direction of scanning" is used to designate a plurality of parallel axes between them and along which the optical wave can be emitted.

The scanner may be such that:
the support includes a fixed part and a beam, the beam comprising a first portion and a second portion, the first portion of the beam being integral with the fixed part of the support and the second portion of the beam forms the first movable part of the support, and
the actuator is configured to bend the second portion of the beam around the first axis of rotation and/or to deform in twisting the second portion of the beam around the first axis of rotation (which is then parallel to the length of the beam).

The rotation movement of the first movable part of the support in rotation about the first axis of rotation is therefore obtained by bending and/or twisting the beam.

Alternatively, the scanner may be such that:
the support further includes at least two first arms, the first movable part of the support being suspended by the two first arms which are aligned parallel to the first axis of rotation, the two first arms comprising first ends that are coupled to two opposite sides of the first movable part of the support, and
the actuator includes two first parts each one configured to deform in twisting and/or in bending of one of the two first arms.

In this configuration, the rotation movement of the first movable part of the support about the first axis of rotation is therefore obtained by twisting and/or bending the two first arms.

In this case, the scanner may be such that:
the support further includes second arms and a second movable part which is suspended by the second arms which are aligned parallel to a second axis of rotation perpendicular to the first axis of rotation, the two first arms comprising second ends opposite the first ends and which are coupled to the second movable part, the second arms comprising first ends coupled to two opposite sides that the second movable part of the support includes and second ends coupled to a fixed part that the support includes, and
the actuator includes two second parts each one configured to deform in twisting and/or in bending of one of the two second arms.

In this configuration, the movement of the second movable part contributes to the scanning of the optical beam emitted from the optical phase shifters along a second dimension, i.e. parallel to a second direction of scanning, perpendicular to the first dimension.

The first movable part of the support may include a face whereon the phased optical grating is disposed, the first and second arms able to be aligned along two directions parallel to said face of the first movable part of the support.

The plurality of optical phase shifters may be aligned in parallel or perpendicular to the first axis of rotation.

When the optical phase shifters are aligned parallel to the first axis of rotation, they contribute to the scanning of the optical beam emitted from the optical phase shifters along a second dimension perpendicular to the first dimension.

When the optical phase shifters are aligned perpendicular to the first axis of rotation, they contribute to the scanning of the optical beam emitted from the optical phase shifters along the first dimension.

Alternatively, the plurality of optical phase shifters may be arranged by forming an array of several lines and several columns of optical phase shifters. Such an array of optical phase shifters can contribute to the scanning of the beam along two dimensions which correspond or do not correspond to the dimension or dimensions for which the movable part of the support is set into motion. Such an array can also be used to fulfil a more complex optical function (focussing, diffraction, etc.). The phased optical grating can be used to produce functions other than the 2D scanning of an optical beam, such as for example to form diffractive optical elements such as dynamic virtual lenses for the beam focussing or division. It can also be used to produce holograms in real time.

The actuator may include means for actuating of at least one of the following types: electrostatic, magnetic, piezoelectric, thermal. Other types of actuating means are also possible.

The actuator may include one or more separate parts, each one including a portion of piezoelectric material disposed between two electrodes. Such a configuration is particular advantageous because each part of the actuator can be directly integrated on the or on one of the movable parts.

The plurality of optical phase shifters may include diffraction gratings coupled to thermal or piezoelectric means of phase shifting. The optical beam is emitted from the diffraction gratings.

The optical phase shifters may generate an optical wave by constructive interference or by destructive interference.

Another embodiment relates to a method for producing a scanner, including at least the steps of:
producing, on a first part of a support, a phased optical grating including at least one plurality of optical phase shifters and an optical source coupled to the plurality of optical phase shifters which is able to emit an optical beam coming from the optical source;
producing an actuator configured to move the first part of the support;
etching the support such that the first part of the support is movable.

Producing the phased optical grating may include:
depositing a first cladding layer on the support;
depositing a core layer on the first cladding layer;
etching the core layer, forming diffraction gratings;
depositing a second cladding layer on the diffraction gratings and on the first cladding layer.

"Cladding layer" designates a layer of material adapted to form a waveguide and diffraction grating cladding. "Core layer" designates a layer of material adapted to form a waveguide and diffraction grating core.

Producing the actuator may include:
- depositing a first electrically conductive layer on the second layer of $SiO_2$;
- depositing or transferring a layer of piezoelectric material on the first electrically conductive layer;
- depositing a second electrically conductive layer on the layer of piezoelectric material;
- etching successively the second electrically conductive layer, the layer of piezoelectric material and the first electrically conductive layer, forming at least one portion of piezoelectric material disposed between two electrodes.

BRIEF DESCRIPTION OF THE DRAWINGS

The present invention shall be better understood when reading the description of embodiments given solely for the purposes of information and in reference to the accompanying drawings wherein.

Figure 1:
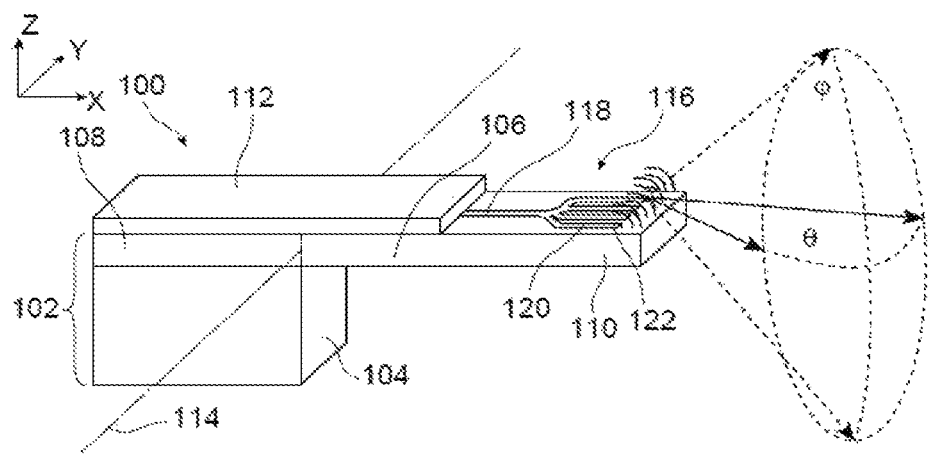
FIGS. 1 to 3 show scanners according to several embodiments.

Identical, similar or equivalent parts of the different figures described hereinafter bear the same numerical references so as to facilitate passing from one figure to the other.

The various parts shown in the figures are not shown necessarily to a uniform scale, in order to make the figures more legible.

The various possibilities (alternatives and embodiments) must be understood as not being exclusive one from the other and can be combined together.

DETAILED DISCLOSURE OF PARTICULAR EMBODIMENTS

A scanner 100 according to a first embodiment is described hereinbelow in relation with FIG. 1.

The scanner 100 includes a support 102. The support 102 is produced from a substrate that comprises for example a semi-conductor such as silicon.

The support 102 forms a fixed part 104, i.e. not movable.

In this first embodiment, the support 102 includes a beam 106 of which a first portion 108 is integral with the fixed part 104 of the support 102. A second portion 110 of the beam 106 is not disposed on the fixed part 104 and forms a movable part of the support 102 that can be set into motion with regard to the fixed part 104. In FIG. 1, the two portions 108, 110 of the beam 106 are symbolically separated by a dotted line.

The scanner 100 also includes an actuator 112 configured to move the movable part of the support 102. This actuator 112 is for example of the electrostatic, magnetic, piezoelectric or thermal type. In the example shown in FIG. 1, the actuator 112 is of the piezoelectric type, and includes a portion of piezoelectric material disposed between two electrodes.

The actuator 112 is disposed on the beam 106, and here covers at least partially the first portion 108 and a part of the second portion 110 of the beam 106. The actuator 112 is thus configured to move the movable part, formed by the second portion 110 of the beam 106, in relation to the fixed part of the support 102. In this first embodiment, this movement corresponds to a bending of the second portion 110 of the beam 106 around an axis of rotation 114. Thus, by applying a non-zero electrical voltage on the electrodes of the actuator 112, the latter can move the second portion 110 of the beam 106 in rotation about the axis of rotation 114, by bimetal effect.

In the example shown in FIG. 1, a larger dimension of the beam 106, i.e. the length thereof (dimension parallel to the X axis visible in FIG. 1), is perpendicular to the axis of rotation 114 (which is parallel to the Y axis visible in FIG. 1). The length of the beam 106 is for example between 1 µm and several millimetres, or between 1 µm and 9 mm. The thickness of the beam 106 (dimension parallel to the axis Z visible in FIG. 1) is for example between 100 nm and several tens of microns, or between 100 nm and 99 µm.

The scanner 100 also includes a phased optical grating 116. This grating 116 is disposed on the movable part of the support 102, i.e. on the second portion 110 of the beam 106. The grating 116 includes an optical source 118 coupled to several waveguides 120 that separate the main optical beam coming from the optical source 118 into several secondary optical beams. The optical source 118 is for example of the LASER type and the wavelength of the light emitted by the source 118 depends in particular on the targeted application for the scanner 100. For example, for a LIDAR application, the wavelength of the light emitted by the optical source 118 may be between 905 nm and 1550 nm for reasons of ocular safety. Each waveguide 120 is coupled to at least one optical phase shifter 122 applying a phase shift to the secondary optical beam received. Each optical phase shifter 122 includes for example a diffraction grating coupled to means for phase shifting that make it possible to apply to the secondary optical beam received by the optical phase shifter 122 a phase shift. In the first embodiment described here, the optical phase shifters 122 are aligned next to one another on the second portion 110 of the beam 106 and parallel to the axis of rotation 114. The phase shifting means (not visible in FIG. 1) of the optical phase shifters 122 correspond for example to piezoelectric actuators or to means of heating.

Details for producing such a grating 116 are for example described in the document "Silicon optical phased grating with high efficiency beam formation over 180 degree field of view" by C. T. Phare et al., Applied Physics Optics 2018.

Thanks to the bending of the beam 106 around the axis of rotation 114 produced by the actuator 112, the optical wave emitted by the grating 116 can be directed along a first direction of scanning perpendicular to the surface of the beam 106 whereon the grating 116 is located by forming, with respect to the axis parallel to the length of the beam 106 at rest, i.e. not bent by the actuator 112, an angle φ that can vary for example between about −20° and +20°, even more substantial values such as for example between about −90° and +90°.

In addition, the phased optical grating 116 makes it possible to emit an optical beam forming an optical wave along a second direction of scanning parallel to the axis of rotation 114, and therefore perpendicular to the first direction of scanning. The optical wave emitted by the grating 116 can therefore be directed according to this second direction of scanning by forming, in relation to an axis parallel to the length of the beam 106, an angle θ that can vary for example between about −80° and +80°. By way of example, when the grating 116 includes 64 optical phase shifters that integrate thermal means of phase shifting, the angle θ obtained can reach 160° (−80° to +80° with respect to the axis parallel to the length of the beam 106).

By way of example, when the beam 106 has a thickness equal to 2 µm, the amplitude of the oscillation obtained at the end of the beam 106 where the grating 116 is located may be between 10 nm and a few hundred microns, or between 10 nm and 900 μm, according to the length of the beam 106.

In the first embodiment described hereinabove, the first direction of scanning obtained thanks to the phase shifting of the optical wave emitted by the phased optical grating 116 is perpendicular to the second direction of scanning obtained thanks to the setting into motion of the movable part of the support 102. The optical wave emitted by the scanner 100 can then scan a surface of which the limits are defined by the maximum values of the angles θ and φ.

Figure 2:
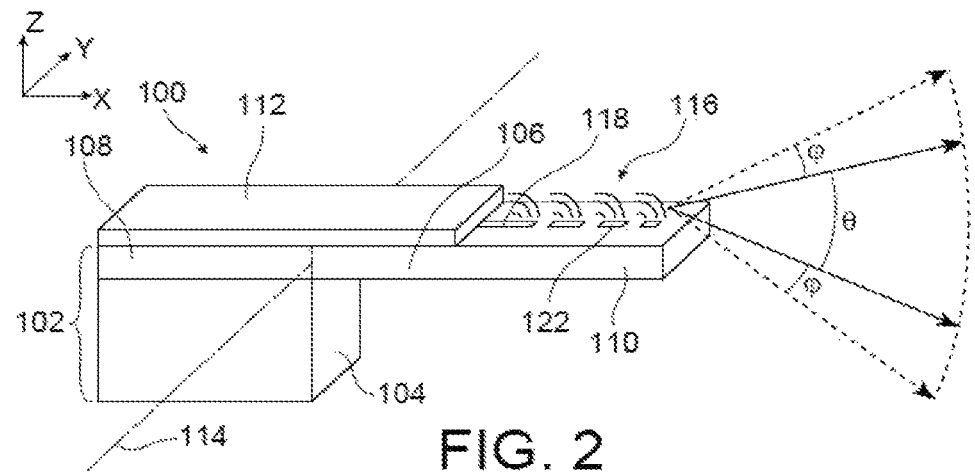

A scanner 100 according to the second embodiment is described hereinbelow in relation with FIG. 2.

The scanner 100 according to this second embodiment includes a support 102 and an actuator 112 similar to those described hereinabove for the first embodiment.

The scanner 100 according to this second embodiment includes the phased optical grating 116 disposed on the second portion 110 of the beam 106. The grating 116 includes the optical source 118 which is coupled to the optical phase shifters 122 which are aligned one next to the other on the second portion 110 of the beam 106. The optical phase shifters 122 include for example, as in the first embodiment, diffraction gratings coupled to piezoelectric or thermal means of phase shifting.

Contrary to the first embodiment, the optical phase shifters 122 are here aligned perpendicularly to the axis of rotation 114. Thus, the phased optical grating 116 makes it possible to emit an optical wave along the first direction of scanning. The optical wave emitted by the grating 116 can therefore be directed along this first direction of scanning by forming, with respect to the axis parallel to the length of the beam 106 that is not bent by the actuator 112, an angle θ able to vary for example between about −20° and +20°, or even more substantial values such as for example between about −90° and +90°. This deviation of angle θ of the optical wave is added to that of angle φ provided by the bending of the beam 106 around the axis of rotation 114 produced by the actuator 112. Thus, with respect to the axis parallel to the length of the beam 106 that is not bent by the actuator 112, the optical wave can be emitted along the first direction of scanning by forming the angles −(θ+φ)° and +(θ+φ)°.

In the two embodiments described hereinabove, the second portion 110 of the beam 106 is set into motion by bending. Alternatively, it is possible that the actuator 112 deform the second portion 110 of the beam 106 in twisting around the axis of the beam 106 which is parallel to the length of the beam 106. This twisting movement makes it possible to obtain a movement of rotation of the second portion 110 about the axis of the beam 106 and therefore to obtain a scanning that is different from those described hereinabove. This deformation in twisting of the second portion 110 of the beam 106 may be combined or not with the bending movement of the second portion 110 of the beam 106.

A scanner 100 according to the third embodiment is described hereinbelow in relation with FIG. 3 (which corresponds to a top view of the scanner 100).

The scanner 100 includes a support 102 that is different from the one described hereinabove for the first and second embodiments. The support 102 here includes a first movable part 124 suspended by two first arms 126 aligned parallel to the first axis of rotation 128 of the first movable part 124. In FIG. 3, the first axis of rotation 128 is parallel to the axis Y. First ends of the arms 126 are coupled to two opposite sides of the first movable part 124. Second ends of arms 126 are coupled to a second movable part 130 of the support 102.

This second movable part 130 is suspended from a fixed part 132 of the support 102 by second arms 134 aligned parallel to a second axis of rotation 136 perpendicular to the first axis of rotation 128. In FIG. 3, the second axis of rotation 136 is parallel to the axis X. First ends of the second arms 134 are coupled to two opposite sides of the second movable part 130 and second ends of the second arms 134 are coupled to the fixed part 132.

The first arms 126 and the second arms 134 are aligned along two directions (axes X and Y) parallel to a face 138 of the first movable part 124 whereon a phased optical grating 140 is disposed. The grating 140 includes the optical source 118 coupled to the waveguides 120 that separate the main optical beam coming from the optical source 118 into several secondary optical beams. Each waveguide 120 is coupled to several optical phase shifters 122, for example similar to those described hereinabove for the first and second embodiments. In the third embodiment described here, the optical phase shifters 122 are arranged by forming an array of several lines and several columns of optical phase shifters 122.

Figures 3, 4, 5:
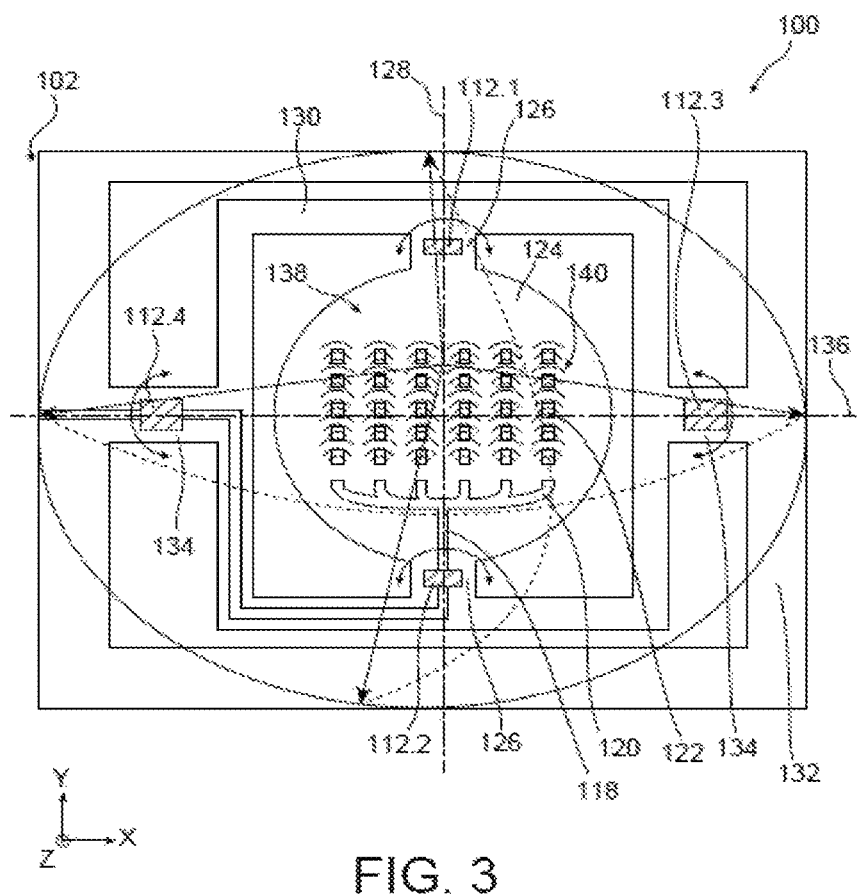
FIGS. 4 to 15 show that steps of a method for producing a scanner according to an embodiment.

In this third embodiment, the actuator 112 includes several separate parts, references as 112.1, 112.2, 112.3 and 112.4 in FIG. 3, each one disposed on one of the first and second arms 126, 134. Each one of these parts 112.1-112.4 includes for example a portion of piezoelectric material disposed between two electrodes and makes it possible to deform in twisting the arm whereon this part of the actuator 112 is disposed. Thus, the parts 112.1 and 112.2 of the actuator 112 make it possible to move in rotation about the first axis of rotation 128 the first movable part 124 thanks to the twisting of the first arms 126, and the parts 112.3 and 112.4 of the actuator 112 make it possible to move in rotation about the second axis of rotation 136 the second movable part 130, and therefore also the first movable part 124, thanks to the twisting of the second arms 134.

The setting in rotation of the movable part 124 about the first axis of rotation 128 makes it possible to direct the optical beam emitted by the grating 140 along a first direction of scanning parallel to the second axis of rotation 136. The setting into rotation of the movable parts 124 and 130 about the second axis of rotation 136 makes it possible to direct the optical beam emitted by the grating 140 along a second direction of scanning parallel to the first axis of rotation 128.

By way of example, when the first movable part 124 has a substantially circular shape, the radius of the first movable part 124 is for example between about 250 μm and 1 mm, and the resonance frequency thereof may be between about 1 kHz and 15 kHz according to the shape and the dimensions of the first arms 126. For example, a first movable part 124 with a radius equal to 500 μm actuated at a resonance frequency of 8.707 kHz by applying a voltage equal to 1 $V_{RMS}$ on each part of the actuator 112 makes it possible to obtain, at the edges of the first movable part 124, an amplitude movement equal to 4.7 μm with respect to the position of the first movable part 124 at rest.

According to a first example of this third embodiment, the phased optical grating 140 may be used to increase the surface scanned by the optical beam emitted by the grating 140. Indeed, the deviations of the angle of the optical beam obtained thanks to the movements of the first movable part 124 about the axes of rotation 128 and 136 are combined in this case with the deviations of the angles of the optical beam obtained by the phase shiftings generated by the grating 140.

According to a second example of this third embodiment, the grating 140 may be used to fulfil a different function such as a focussing along a dimension perpendicular to the surface 138 whereon the grating 140 is disposed (dimension parallel to the axis Z in FIG. 3). Thus, it is possible to focus the optical beam emitted by the grating 140 at a variable distance from the surface 138. The grating 140 may be used to form diffractive optical elements such as dynamic virtual lenses for beam focussing or division. It can also be used to produce holograms.

Alternatively to this third embodiment, it is possible that the support 102 includes, as in the previously described example, the first movable part 124 suspended by the two first arms 126, but that the second ends of the arms 126 be coupled directly to the fixed part 132. In this case, the support 102 does not include the second movable part 130 or the second arms 134. The grating 140 can make it possible to produce deviations of angles around the axis 136, i.e. move the optical beam along the second direction of scanning, even in the absence of the second movable part 130 and of the second arms 134, thanks to the phase shiftings of the grating 140. The movement amplitude of the optical beam along the second direction of scanning will however be less than in the example described hereinabove since in this alternative, the movement of the movable part of the support 102 does not contribute to the movement of the optical beam along the second direction of scanning.

Generally, for all the embodiments, the actuator 112 may be of the electrostatic (or capacitive), magnetic, piezoelectric or thermal type.

Many alternative embodiments of the scanner 100 may be considered.

According to an alternative, it is for example possible that the scanner 100 described hereinabove according to the first or second embodiment comprises a phased optical grating similar to the grating 140 described hereinabove for the third embodiment, i.e. including an array of several lines and several columns of optical phase shifters 122. In this case, the grating 140 may contribute to increasing the angle of the deviation provided by the movement of the beam 108 along the first direction of scanning, and to deviate the optical beam emitted along another direction of scanning perpendicular to the first direction of scanning. Alternatively, the grating 140 may be used to deviate the optical beam emitted along two directions perpendicular to that according to which the beam 108 provides a deviation, with one of these two directions used for example to produce a focussing of the optical beam emitted along an axis perpendicular to the surface whereon the grating 140 is located.

According to another embodiment, it is for example possible that the scanner 100 described hereinabove according to the third embodiment comprises a phased optical grating similar to the grating 116 described hereinabove for one of the first and second embodiments.

For all the embodiments, the support 102 (fixed part+ movable part) may also be set into motion so as to increase the possibilities of direction towards which the optical beam is sent.

In the various embodiments and example described hereinabove, the movable part of the support is set into motion in rotation about one or more axes of rotation. Generally, it is possible that the movable part of the support be set into motion by a movement of rotation and/or of bending and/or of translation.

An example of a method for producing the scanner 100, according to one of the embodiments described hereinabove, is detailed hereinbelow in relation with FIGS. 4 to 15.

The scanner 100 is produced from a substrate 105, comprising for example silicon. In FIG. 4, the substrate 105 includes alignment marks 107. The substrate 105 here forms the support 102.

The phased optical grating 116 or 140 is first of all produced on the substrate 105. In the example described here, the grating produced correspond to the grating 116 described hereinabove in relation with the first and second embodiments.

To this end, a first cladding layer 109 is produced, or deposited, on the substrate 105. The layer 109 includes for example $SiO_2$, obtained for example by oxidation of the silicon of the substrate 105 (see FIG. 5). The dielectric material of the layer 109 is adapted to form a cladding material of a waveguide, and corresponds for example to $SiO_2$ or a polymer material. The layer 109 has for example a thickness between about 500 nm and 3 µm.

A waveguide core layer 111 is then deposited on the layer 109. The optical index, or refractive index, of the material of the layer 111 is different from that of the layer 109. In the embodiment described here, the material of the layer 111 is SiN. Other materials may be used to produce the layer 111, such as for example polycrystalline silicon. The thickness of the layer 111 is for example between about 100 nm and 1 µm.

Figure 6:
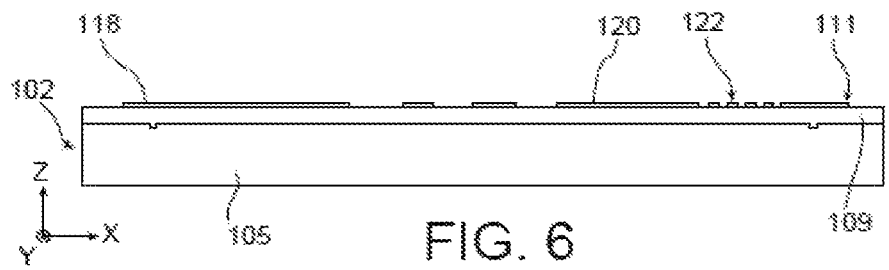

The layer 111 is then etched, or structured, so as to form in particular the diffraction gratings of the optical phase shifters 122 as well as the waveguide or waveguides 120 used to convey the optical beam or beams from the light source 118 to the optical phase shifters 122 (see FIG. 6).

Figure 7:
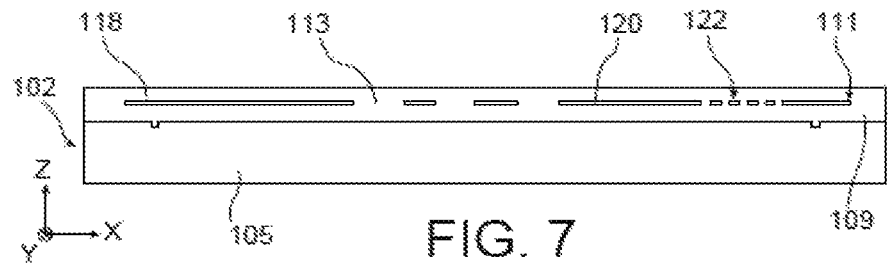

A second cladding layer 113 is then produced to cover the etched layer 111 (see FIG. 7). The material of the layer 113 is chosen such that the optical index of the material of the layer 113 is different from that of the layer 111 and is for example similar to that of the layer 109. The dielectric material of the layer 113 is adapted to form a cladding material of a waveguide, and corresponds for example to $SiO_2$. The thickness of the layer 113 is for example between about 500 nm and 3 µm.

The actuator 112 is then produced. In the production method described here, the actuator 112 is of the piezoelectric type.

Figure 8:
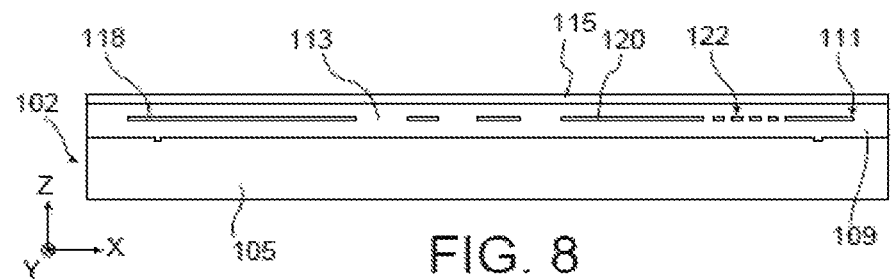

A first electrically conductive layer 115 is deposited on the layer 113 (see FIG. 8). This first electrically conductive layer 115 is intended to form one of the electrodes of the actuator 112, or one of the electrodes of each one of the different parts of the actuator 112 (as is the case for the third embodiment described hereinabove). The layer 115 includes for example platinum or molybdenum, with the nature of this material being chosen according to the piezoelectric material that will be used. The thickness of the layer 115 is for example between about 100 nm and 200 nm.

Figure 9:
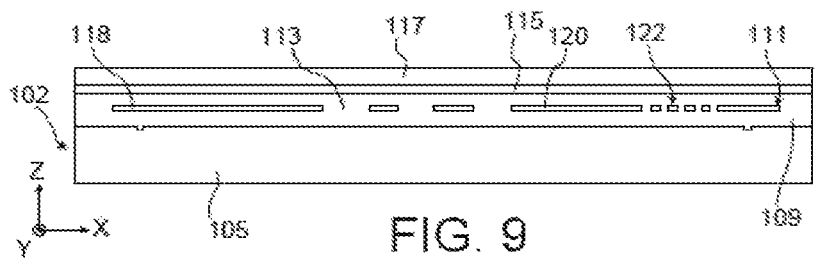

A layer of piezoelectric material 117 is then deposited on the layer 115 (see FIG. 9). This layer 117 includes for example PZT, AlN, ZnO or BST ($Ba_{1-x}Sr_xTiO_3$). The thickness of the layer 117 is for example between about 500 nm and 2 µm.

A second electrically conductive layer 119 is then deposited on the layer 117. This second electrically conductive layer 119 is intended to form the other electrode of the actuator 112 or of each one of the parts of the actuator 112. The layer 119 includes for example platinum or Mo or Ru. The thickness of the layer 119 is for example between about 100 nm and 200 nm.

This layer 119 is then etched, by dry or wet etching, so that the remaining portion or portions of this layer 119 form the upper electrode of the actuator 112 or of each one of the parts of the actuator 112.

Figure 10:
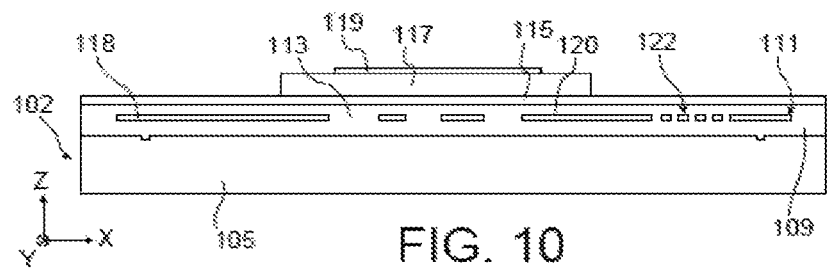

The layer 117 is also etched by dry etching (for example a plasma etching) so that the remaining portion or portions of this layer 117 form the portion of piezoelectric material of the actuator 112 or of each one of the parts of the actuator 112 (see FIG. 10). The layer 117 is etched such that the part or parts of the layer 115 intended to form the lower electrode or electrodes of the actuator 112 are not completely covered by the remaining portion or portions of the layer 117, in order to have parts of the layer 115 that can be accessed electrically.

Figure 11:
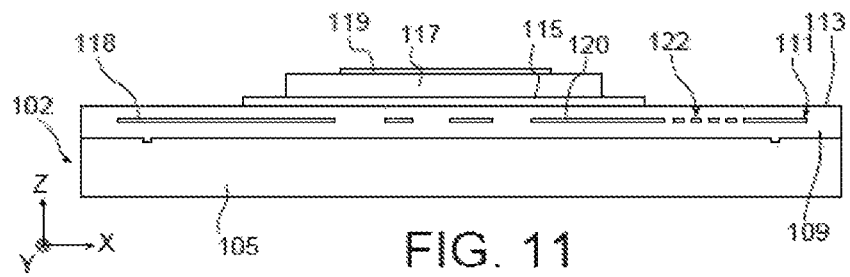

The layer 115 is then etched by dry etching (for example a plasma etching) so that the remaining portion or portions of this layer 115 form the lower electrode of the actuator 112 or of each one of the parts of the actuator 112 (see FIG. 11). The layer 115 is etched such that one or more parts of the layer 115 are not covered by the remaining portion or portions of the layer 117, so as to have parts of the layer 115 that can be accessed electrically.

When the optical phase shifters 122 include piezoelectric phase shifting means, the steps described hereinabove to produce the actuator 112 may also be used to produce these piezoelectric phase shifting means which may correspond to piezoelectric actuators, coupled to one another or independent from one another, and comprising, like the actuator 112, a portion of piezoelectric material disposed between two electrodes. The mechanical deformations generated by actuating these piezoelectric actuators make it possible in this case to phase shift the optical wave emitted by the optical phase shifters 122.

Alternatively, when the optical phase shifters 122 include thermal phase shifting means, heating elements may be integrated between waveguides 120 and the actuator 122, these heating elements providing in this case the phase shifting of the optical wave emitted by the optical phase shifters 122 by heating the material of the layer 111 to the desired temperature, according to the required phase shifting.

A passivation layer 121 is then deposited by covering the layer 113 as well as the actuator 112. The layer 121 includes for example an oxide such as $SiO_2$, SiN or $Si_3N_4$.

Figure 12:
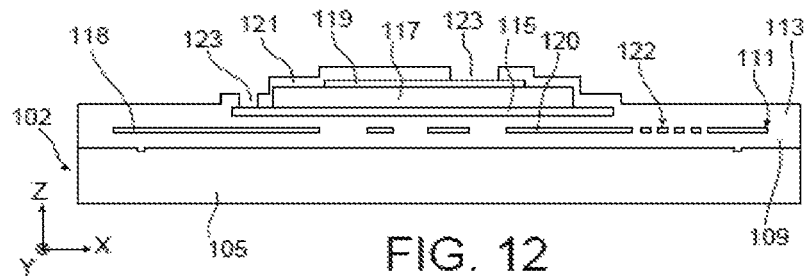

First openings 123 are then etched through the layer 121 so as to form accesses to the upper and lower electrodes of the actuator 112 (see FIG. 12).

Figure 13:
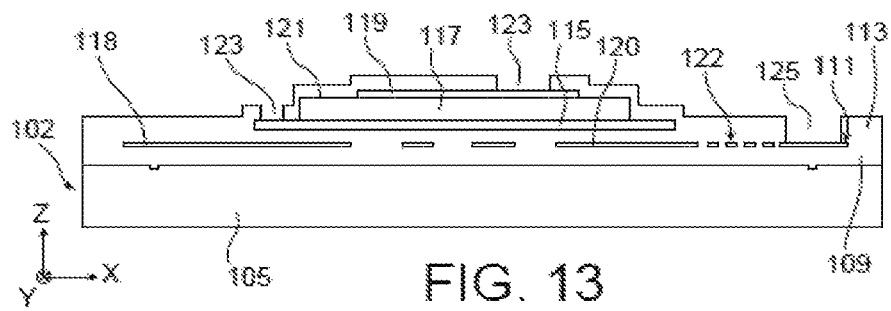
Figure 14:
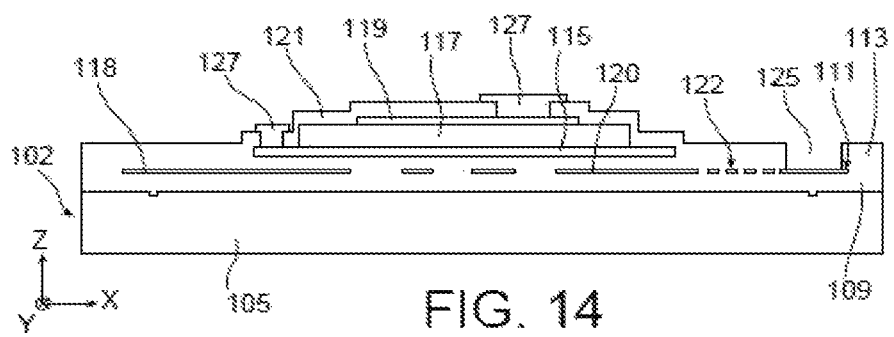

One or more second openings 125 are then etched through the layer 121, facing optical phase shifters 122, in order to allow for the extraction of the light from the optical phase shifters 122 (see FIG. 13).

Electrically conductive pads 127 are then produced, for example by depositing an electrically conductive material then by etching this material, in the first openings 123. These pads 127 are electrically connected to the electrodes of the actuator 112 and allow for the sending of control signals to the actuator 112 (see FIG. 14).

Figure 15:
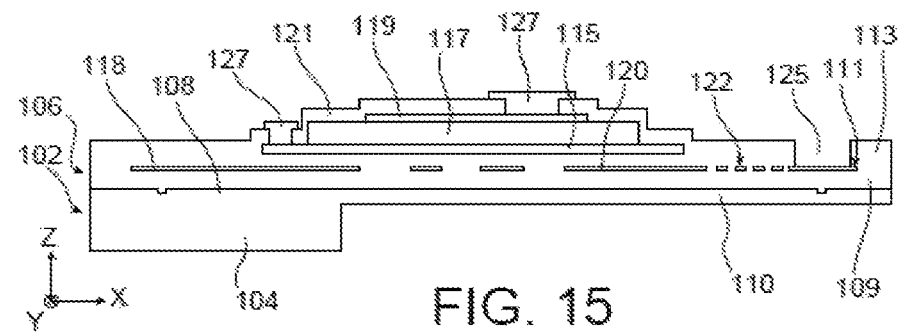

The substrate 105 is then etched from the rear face thereof in order to form the movable part or parts of the scanner 100 (see FIG. 15). In the example described here, etching the substrate 105 makes it possible to form the beam 106 that includes the first portion 108 and the second portion 110.

The invention claimed is:

1. A scanner including at least:
   a support including at least one first movable part,
   an actuator configured to move said at least one first movable part of the support, and
   a phased optical grating disposed on said at least one first movable part of the support and including at least one plurality of optical phase shifters and an optical source coupled to said at least one plurality of optical phase shifters which is able to emit an optical beam coming from the optical source,
   wherein the at least one movable part of the support includes a beam,
   the phased optical grating is integrated into a face of the beam.

2. The scanner according to claim 1, wherein the actuator is configured to move said at least one first movable part of the support in rotation about at least one first axis of rotation.

3. The scanner according to claim 2, wherein:
   the support includes a fixed part,
   the beam comprises a first portion and a second portion, the first portion of the beam being integral with the fixed part of the support and the second portion of the beam forms said at least one first movable part of the support, and
   the actuator is configured to bend the second portion of the beam around said at least one first axis of rotation and/or to deform in twisting the second portion of the beam around said at least one first axis of rotation.

4. The scanner according to claim 2, wherein:
   the support further includes at least two first arms, said at least one first movable part of the support being suspended by said at least two first arms which are aligned parallel to said at least one first axis of rotation, said at least two first arms comprising first ends that are coupled to two opposite sides of said at least one first movable part of the support, and
   the actuator includes two first parts each one configured to deform in twisting and/or in bending one of said at least two first arms.

5. The scanner according to claim 4, wherein:
   the support further includes second arms and a second movable part which is suspended by the second arms which are aligned parallel to a second axis of rotation perpendicular to said at least one first axis of rotation, said at least two first arms comprising second ends opposite the first ends and which are coupled to the second movable part, the second arms comprising first ends coupled to two opposite sides that the second movable part of the support includes and second ends coupled to a fixed part that the support includes, and
   the actuator includes two second parts each one configured to deform in twisting and/or in bending of one of the two second arms.

6. The scanner according to claim 5, wherein said at least one first movable part of the support includes a face whereon the phased optical grating is disposed, the first and second arms being aligned in two directions parallel to said face of said at least one first movable part of the support.

7. The scanner according to claim 2, wherein said at least one plurality of optical phase shifters is aligned in parallel or perpendicularly to said at least one first axis of rotation.

8. The scanner according to claim 2, wherein said at least one plurality of optical phase shifters is arranged by forming an array of several lines and columns of optical phase shifters.

9. The scanner according to claim 1, wherein the actuator includes means for actuating at least one of the following types: electrostatic, magnetic, piezoelectric, and thermal.

10. The scanner according to claim 1, wherein the actuator includes one or more separate parts, each one including a portion of piezoelectric material disposed between two electrodes.

11. The scanner according to claim 1, wherein said at least one plurality of optical phase shifters includes diffraction gratings coupled to thermal or piezoelectric means of phase shifting.

12. A scanner comprising:
a support including at least one first movable part having a beam,
an actuator configured to move said at least one first movable part of the support, and
a phased optical grating formed on a face of the beam and including at least one plurality of optical phase shifters and an optical source coupled to said at least one plurality of optical phase shifters which is able to emit an optical beam coming from the optical source,
wherein the actuator is configured to
bend the beam to scan the optical beam in a first direction perpendicular to the face of the beam about a first angle varying between about −20° and 20° with respect to an axis parallel to a longitudinal direction of the beam when the beam is not bent, and
bend the beam to scan the optical beam in a second direction perpendicular to the first direction about a second angle varying between about −80° and 80° with respect to the axis.

13. The scanner according to claim 12, wherein first angle varies between about −90° and 90° with respect to the axis.

* * * * *